United States Patent
Li

(10) Patent No.: US 10,560,395 B2
(45) Date of Patent: Feb. 11, 2020

(54) METHOD AND APPARATUS FOR DATA TRAFFIC RESTRICTION

(71) Applicant: Huawei Technologies Co., Ltd., Shenzhen (CN)

(72) Inventor: Yi Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 159 days.

(21) Appl. No.: 15/224,232

(22) Filed: Jul. 29, 2016

(65) Prior Publication Data

US 2016/0337259 A1    Nov. 17, 2016

Related U.S. Application Data

(63) Continuation of application No. PCT/CN2014/087395, filed on Sep. 25, 2014.

(30) Foreign Application Priority Data

Jan. 29, 2014  (CN) .......................... 2014 1 0043708

(51) Int. Cl.
*H04L 12/911* (2013.01)
*H04L 12/709* (2013.01)
*H04L 12/819* (2013.01)

(52) U.S. Cl.
CPC ............ *H04L 47/70* (2013.01); *H04L 45/245* (2013.01); *H04L 47/215* (2013.01)

(58) Field of Classification Search
CPC ..... H04L 47/70; H04L 47/215; H04L 45/245; H04L 12/6418; H04L 45/28; H04L 45/16; Y02D 50/30
See application file for complete search history.

(56) References Cited

U.S. PATENT DOCUMENTS

| 5,596,576 A | 1/1997 | Milito |
| 5,790,521 A * | 8/1998 | Lee ..................... H04L 12/5602 370/230 |

(Continued)

FOREIGN PATENT DOCUMENTS

| CN | 1534926 A | 10/2004 |
| CN | 1859206 A | 11/2006 |

(Continued)

OTHER PUBLICATIONS

Heinanen et al., "A Single Rate Three Color Marker," Network Working Group, RFC: 2697, pp. 1-6, The Internet Society (Sep. 1999).

(Continued)

*Primary Examiner* — Andrew Lai
*Assistant Examiner* — Chuong M Nguyen
(74) *Attorney, Agent, or Firm* — Leydig, Voit & Mayer, Ltd.

(57) ABSTRACT

A method and an apparatus for data traffic restriction are applied to a network device where a link aggregation group interface includes member ports. Firstly, configuring, for each link aggregation group interface, a credit bucket for storing tokens overflowing from a token bucket corresponding to each member port, and the tokens overflowing from the different token buckets are distinctively labeled; receiving a packet to be sent, if a number of tokens in the token bucket is not sufficient for sending the packet to be sent, borrowing, from the credit bucket, tokens overflowing from a non-current token bucket, if the tokens of the current token bucket and the borrowed tokens are sufficient for sending the packet to be sent, sending the packet to be sent, and meanwhile, reducing the number of tokens in the current token bucket and tokens in the credit bucket. A dynamic restriction of data traffic is achieved.

16 Claims, 9 Drawing Sheets

(56) References Cited

U.S. PATENT DOCUMENTS

| | | | |
|---|---|---|---|
| 8,032,653 B1 * | 10/2011 | Liu | H04L 47/10 370/235.1 |
| 8,593,969 B1 | 11/2013 | Kondapalli et al. | |
| 9,363,184 B2 * | 6/2016 | Zhong | H04L 47/215 |
| 2003/0227932 A1 * | 12/2003 | Meempat | H04L 49/101 370/415 |
| 2004/0008625 A1 * | 1/2004 | Lee | H04L 12/5601 370/229 |
| 2006/0176818 A1 * | 8/2006 | Olsen | H04L 47/10 370/235 |
| 2006/0215558 A1 * | 9/2006 | Chow | H04L 47/10 370/232 |
| 2007/0070895 A1 * | 3/2007 | Narvaez | H04L 47/10 370/230 |
| 2008/0298245 A1 * | 12/2008 | Onbeck | H04L 47/10 370/235.1 |
| 2011/0083175 A1 * | 4/2011 | Bharrat | H04L 47/20 726/13 |
| 2013/0286845 A1 * | 10/2013 | Smith, Jr. | H04L 43/0894 370/235.1 |
| 2015/0016266 A1 * | 1/2015 | Dumitrescu | H04L 47/623 370/236 |

FOREIGN PATENT DOCUMENTS

| | | | |
|---|---|---|---|
| CN | 1859207 | A * | 11/2006 |
| CN | 1859207 | A | 11/2006 |
| CN | 101834786 | A | 9/2010 |
| CN | 102185777 | A * | 9/2011 |
| CN | 102368741 | A | 3/2012 |
| CN | 103763208 | A | 4/2014 |
| EP | 1705851 | A1 | 9/2006 |
| JP | H1049390 | A | 2/1998 |
| JP | 2009081629 | A | 4/2009 |
| KR | 20080062215 | A | 7/2008 |

OTHER PUBLICATIONS

Heinanen et al., "A Two Rate Three Color Marker," Network Working Group, RFC: 2698, pp. 1-5, The Internet Society (Sep. 1999).

* cited by examiner

METHOD AND APPARATUS FOR DATA TRAFFIC RESTRICTION

CROSS-REFERENCE TO RELATED APPLICATIONS

This application is a continuation of International Application No. PCT/CN2014/087395, filed on Sep. 25, 2014, which claims priority to Chinese Patent Application No. 201410043708.5, filed on Jan. 29, 2014, both of which are hereby incorporated by reference in their entireties.

TECHNICAL FIELD

The present invention relates to the field of network communication technologies, and in particular, to a method and an apparatus for data traffic restriction.

BACKGROUND

In a communication network, data traffic over a certain link may exceed a service level agreement signed with a service provider, at this time, a bandwidth of other links in the communication network would be occupied by this link, thus resulting in that other links cannot gain normal bandwidth services. In this situation, in order to guarantee the normal running of the communication network, the restriction of data traffic over a link needs to be performed at the entrance of the communication network, so as to prevent the data traffic over a link from exceeding the bandwidth service signed in the service level agreement.

The token bucket is common data traffic restriction technology, where the token bucket is a storage pool inside a network device, and a token refers to a virtual information packet which fills the token bucket at a given rate. Put tokens into the token bucket according to the data traffic allocated to the link, and meanwhile, take tokens out of the token bucket according to the actual data traffic over the link. When there is no token in the token bucket, data cannot be sent to this link anymore. Normally, the network device configures a token bucket for each chip set of single board, if the rate of putting the tokens into the token bucket is greater than the actual data traffic, then tokens received after the token bucket is full will be discarded; if the rate of putting the tokens into the token bucket is less than the actual data traffic, then data cannot be sent anymore after the token bucket ran out of tokens. However, this token access mode cannot make full use of remnant data traffic of the other links in a link aggregation group interface.

In traditional methods for data traffic restriction, it is very hard to keep the actual distributing situation of data traffic over each member port of the link aggregation group interface in accordance with the entire CIR of the link aggregation group interface or the entire PIR (Peak Information Rate, Peak Information Rate) of the link aggregation group interface.

SUMMARY

Embodiments of the present invention provide a method and apparatus for data traffic restriction, so as to solve the technical problem that existing methods for data traffic restriction cannot exactly control data traffic according to a preset whole data traffic for a link aggregation group interface.

In order to solve the foregoing technical problem, embodiments of the present invention disclose following technical solutions:

In a first aspect, the present invention provides a method for data traffic restriction, which is applied to a network device where a link aggregation group interface includes member ports located on chipsets of different single boards, where each link aggregation group interface in the network device is pre-configured with a credit bucket, the credit bucket is used for storing tokens overflowing from a token bucket corresponding to each member port, and the tokens overflowing from different token buckets are distinctively labeled; and, where bucket parameters of the credit bucket and each token bucket are pre-configured, the bucket parameters include a rate of putting tokens into the token bucket, space of the token bucket and space of the credit bucket;

where the method for data traffic restriction includes:

when receiving a packet to be sent, determining whether a number of tokens in a current token bucket corresponding to the packet to be sent reaches a number of tokens for sending the packet to be sent;

if the number of tokens in the current token bucket does not reach the number of tokens for sending the packet to be sent, determining whether a sum of the number of the tokens in the current token bucket and a number of tokens overflowing from a non-current token bucket in the credit bucket reaches the number of tokens for sending the packet to be sent;

if the sum of the number of the tokens in the current token bucket and the tokens in the credit bucket reaches the number of tokens for sending the packet to be sent, sending the packet to be sent, and reducing the number of tokens in the current token bucket and tokens in the credit bucket correspondingly.

With reference to the first aspect, in a first possible implementation of the first aspect, where the determining whether the sum of the number of the tokens in the current token bucket and the tokens overflowing from the non-current token bucket in the credit bucket reaches the number of tokens for sending the packet to be sent includes:

determining a difference of tokens between the number of tokens in the current token bucket and the number of tokens for sending the packet to be sent;

determining whether the number of tokens overflowing from the non-current token bucket in the credit bucket is not less than the difference of tokens;

if the number of tokens overflowing from the non-current token bucket in the credit bucket is not less than the difference of tokens, determining that the sum of the number of the tokens in the current token bucket and the tokens in the credit bucket reaches the number of tokens for sending the packet to be sent;

if the number of tokens overflowing from the non-current token bucket in the credit bucket is less than the difference of tokens, determining the tokens in the current token bucket and the tokens in the credit bucket do not reach the number of tokens for sending the packet to be sent.

With reference to the first aspect or the first possible implementation of the first aspect, in a second possible implementation of the first aspect, further including: if the sum of the number of the tokens in the current token bucket and the number of tokens overflowing from the non-current token bucket in the credit bucket does not reach the number of tokens for sending the packet to be sent, discarding the packet to be sent or relabeling the packet to be sent.

With reference to the first aspect, in a third possible implementation of the first aspect, where the pre-configuring the bucket parameters of the credit bucket and each token bucket includes:

determining, according to a preset method for determining a rate of putting tokens, the rate of putting tokens into each token bucket, where a sum of the rate of putting tokens into each token bucket equals to an entire committed information rate of the link aggregation group interface or a peak information rate of the link aggregation group interface, where the preset method for determining the rate of putting tokens includes a rate equal division determining method or a rate weight determining method;

determining, according to a preset space determining method, the space of each token bucket, where a sum of the space of each token bucket equals to a entire committed burst size of the link aggregation group interface or a peak burst size of the link aggregation group interface, where the preset space determining method includes a space equal division determining method or a space weight determining method;

where the space of the credit bucket equals to the entire committed burst size or the peak burst size.

With reference to the third possible implementation of the first aspect, in a fourth possible implementation of the first aspect, further including: if the credit bucket meets a preset condition, discarding the tokens in the credit bucket;

where the if the credit bucket meets a preset condition, discarding the tokens in the credit bucket includes:

if a token in the credit bucket exceeds a preset duration, discarding the token according to a preset fair scheduling algorithm;

if it is detected that there is no token in a token bucket, discarding the tokens which are stored in the credit bucket and overflow from the token bucket before a current period.

With reference to the first aspect, in a fifth possible implementation of the first aspect, further including:

pre-configuring a debit bucket for each token bucket, where the debit bucket is used for storing tokens overflowing from token buckets belonging to the same chipset of a single board, so that the credit bucket takes tokens from each debit bucket according to a preset fair scheduling algorithm, and setting space of the debit bucket according to a preset space determining method, where a sum of the space of each debit bucket equals to a entire committed burst size or peak burst size, where the preset space determining method includes a space equal division determining method or a space weight determining method.

With reference to the first aspect, the first possible implementation of the first aspect, the third possible implementation of the first aspect, the fourth possible implementation of the first aspect or the fifth possible implementation of the first aspect, in a sixth possible implementation of the first aspect, further including:

in a preset number of latest periods, if borrowing information about borrowing tokens from the credit bucket of the current token bucket meets a preset bucket adjusting condition, increasing the space of the current token bucket according to the borrowing information of the current token bucket; where the borrowing information includes a number of borrowed tokens, a proportion of borrowing and/or a number of times for borrowing tokens;

reducing, according to label distribution information of tokens borrowed from the credit bucket of the current token bucket, the space of corresponding token buckets other than the current token bucket, where a sum of reduced space equals to a sum of increased space;

determining new rates of putting tokens into each token bucket according to the re-determined space of each token bucket and a method for computing the rate of putting tokens.

With reference to the first aspect, the first possible implementation of the first aspect, the third possible implementation of the first aspect, the fourth possible implementation of the first aspect or the fifth possible implementation of the first aspect, in a seventh possible implementation of the first aspect, further including:

in a preset number of latest periods, if borrowing information about borrowing tokens from the credit bucket of the current token bucket meets a preset bucket adjusting condition, increasing, according to the borrowing information of the current token bucket, the rate of putting tokens into the current token bucket from an initial rate of putting tokens to a new rate of putting tokens; where the borrowing information includes a number of borrowed tokens, a proportion of borrowing and/or a number of times for borrowing tokens.

With reference to the seventh possible implementation of the first aspect, in an eighth possible implementation of the first aspect, further including:

adjusting the space of the current token bucket according to the new rate of putting tokens into the current token bucket and a corresponding relation between the rate of putting tokens and the space of the token bucket;

determining, according to label distribution information of tokens borrowed from the credit bucket of the current token bucket, space to be adjusted of corresponding token buckets other than the current token bucket, so that a sum of reduced space equals to a sum of increased space.

In a second aspect, the present invention also provides an apparatus for data traffic restriction, including: a first pre-configuring unit, a receiving unit, a first determining unit, a second determining unit, a sending unit and a token managing unit;

the first pre-configuring unit is configured to pre-configure a credit bucket for each link aggregation group interface in the network device, where the credit bucket is used for storing tokens overflowing from each token bucket, and the tokens overflowing from different token buckets are distinctively labeled; and, pre-configure bucket parameters for the credit bucket and each token bucket, where the bucket parameters include rates of putting tokens into the token buckets, space of the token buckets and space of the credit bucket;

the receiving unit is configured to receive a packet to be sent;

the first determining unit is configured to determine whether a number of tokens in a current token bucket corresponding to the packet to be sent reaches a number of tokens for sending the packet to be sent;

the second determining unit is configured to, if the number of tokens in the current token bucket does not reach the number of tokens for sending the packet to be sent, determine whether a sum of the number of the tokens in the current token bucket and a number of tokens overflowing from a non-current token bucket in the credit bucket reaches the number of tokens for sending the packet to be sent;

the sending unit is configured to, if the sum of the number of the tokens in the current token bucket and the tokens in the credit bucket reaches the number of tokens for sending the packet to be sent, send the packet to be sent;

the token managing unit is configured to reduce the number of tokens in the current token bucket and tokens in the credit bucket correspondingly.

With reference to the second aspect, in a first possible implementation of the second aspect, where the second determining unit includes:

a determining sub-unit, configured to determine a difference of tokens between the number of tokens in the current token bucket and the number of tokens for sending the packet to be sent;

a determining sub-unit, configured to determine whether the number of tokens overflowing from the non-current token bucket in the credit bucket is not less than the difference of tokens;

a first determining sub-unit, configured to, if the number of tokens overflowing from the non-current token bucket in the credit bucket is not less than the difference of tokens, determine that the sum of the number of the tokens in the current token bucket and the tokens in the credit bucket reaches the number of tokens for sending the packet to be sent;

a second determining sub-unit, configured to, if the number of tokens overflowing from the non-current token bucket in the credit bucket is less than the difference of tokens, determine that the tokens in the current token bucket and the tokens in the credit bucket do not reach the number of tokens for sending the packet to be sent.

With reference to the second aspect or the first possible implementation of the second aspect, in a second possible implementation of the second aspect, further including: a packet processing unit; where, the packet processing unit is configured to, if the sum of the number of the tokens in the current token bucket and a number of tokens overflowing from a non-current token bucket in the credit bucket does not reach the number of tokens for sending the packet to be sent, discard the packet to be sent; or, configured to, if the sum of the number of the tokens in the current token bucket and the number of tokens overflowing from the non-current token bucket in the credit bucket does not reach the number of tokens for sending the packet to be sent, re-label the packet to be sent.

With reference to the second aspect or the first possible implementation of the second aspect, in a third possible implementation of the second aspect, where the first pre-configuring unit includes:

a rate of putting tokens configuring unit, configured to determine rates of putting tokens into each token bucket according to a preset method for determining a rate of putting tokens, where a sum of the rate of putting tokens into each token bucket equals to an entire committed information rate of the link aggregation group interface or a peak information rate of the link aggregation group interface, and where the preset method for determining the rate of putting tokens includes a rate equal division determining method or a rate weight determining method;

a first space configuring unit, configured to determine the space of each token bucket according to a preset space determining method, where a sum of the space of each token bucket equals to a entire committed burst size of the link aggregation group interface or a peak burst size of the link aggregation group interface, where the preset space determining method includes a space equal division determining method or a space weight determining method; and a second space configuring unit, configured to configure the space of the credit bucket as the entire committed burst size or the peak burst size.

With reference to the second aspect, in a fourth possible implementation of the second aspect, further including:

a second pre-configuring unit, configured to pre-configure a debit bucket for each token bucket, and set space of the debit bucket according to a preset space determining method, where a sum of the space of each debit bucket equals to a entire committed burst size or a peak burst size, where the preset space determining method includes a space equal division determining method or a space weight determining method, and where the debit bucket is used for storing tokens overflowing from token buckets belonging to the same chipset of a single board, so that the debit bucket equally takes tokens from each debit bucket according to a preset fair scheduling algorithm.

With reference to the second aspect, the first possible implementation of the second aspect or the fourth possible implementation of the second aspect, in a fifth possible implementation of the second aspect, the apparatus further includes:

a first space adjusting unit, configured to, in a preset number of latest periods, if the number of tokens borrowed by the current token bucket from the credit bucket exceeds a first threshold value, increase the space of the token bucket according to the borrowing information of the current token bucket; where the borrowing information includes the label of the token and the corresponding amount of borrowing;

a second space adjusting unit, configured to reduce, according to label distribution information of tokens borrowed from the credit bucket of the current token bucket, the space of corresponding token buckets other than the current token bucket, where a sum of reduced space equals to a sum of increased space; and a first rate of putting tokens adjusting unit, configured to determine new rate of putting tokens into each token bucket according to the re-determined space of each token bucket and a method for computing the rate of putting tokens.

With reference to the second aspect, the first possible implementation of the second aspect or the fourth possible implementation of the second aspect, in a sixth possible implementation of the second aspect, further including:

a second rate of putting tokens adjusting unit, configured to, in a preset number of latest periods, if the number of tokens borrowed by the current token bucket from the credit bucket exceeds a first threshold value, increase the rate of putting tokens into the current token bucket from an initial rate of putting tokens to a new rate of putting tokens according to the borrowing information of the current token bucket, where the borrowing information includes a number of borrowed tokens, a proportion of borrowing and/or the number of times for borrowing tokens.

With reference to the sixth possible implementation of the second aspect, in a seventh possible implementation of the second aspect, further including:

a third space adjusting unit, configured to adjust the space of the current token bucket according to the new rate of putting tokens into the current token bucket and a corresponding relation between the rate of putting tokens and the space of the token bucket; and a fourth space adjusting unit, configured to determine, according to label distribution information of tokens borrowed from the credit bucket of the current token bucket, space to be adjusted of corresponding token buckets other than the current token bucket, so that a sum of reduced space equals to a sum of increased space.

In a third aspect, the present invention provides a network device, including any one of apparatuses according to the second aspect.

As can be seen from the foregoing technical solutions, the method for data traffic restriction as provided in the present invention, firstly, configure for each link aggregation group interface in the network device, a credit bucket for storing tokens overflowing from each token bucket, and the tokens overflowing from different token buckets are distinctively labeled; when receiving a packet to be sent, firstly determine whether the number of tokens in the token bucket corresponding to the packet to be sent reaches the number for sending the packet to be sent, if a number of tokens in the token bucket is not sufficient for sending the packet to be sent, borrow, from the credit bucket, tokens overflowing from a non-current token bucket, if the tokens of the current token bucket and the borrowed tokens are sufficient for sending the packet to be sent, send the packet to be sent, and meanwhile, reduce the number of corresponding tokens in the current token bucket and in the credit bucket. A dynamic restriction of data traffic over a plurality of links of each link aggregation group interface in the network equipment is achieved, so that the sum of the data traffic over the member ports in the link aggregation group interfaces can be better matched with the entire data traffic restricted for the link aggregation group interfaces.

BRIEF DESCRIPTION OF DRAWINGS

To describe the technical solutions in embodiments of the present invention or in the prior art more clearly, the following briefly introduces the accompanying drawings needed for describing the embodiments or the prior art. Apparently, persons of ordinary skill in the art may still derive other drawings from these accompanying drawings without any creative effort.

DESCRIPTION OF EMBODIMENTS

In order to make the technical solutions of embodiments of the present invention more comprehensible, the technical solutions in the embodiments of the present invention are hereinafter described clearly and completely with reference to the accompanying drawings in embodiments of the present invention. Obviously, the embodiments described here are merely part of embodiments of the present invention rather than all of the embodiments. All other embodiments obtained by persons skilled in the art on the basis of the embodiments described in the present invention without any creative effort shall fall within the protection scope of the present invention.

Figure 1:
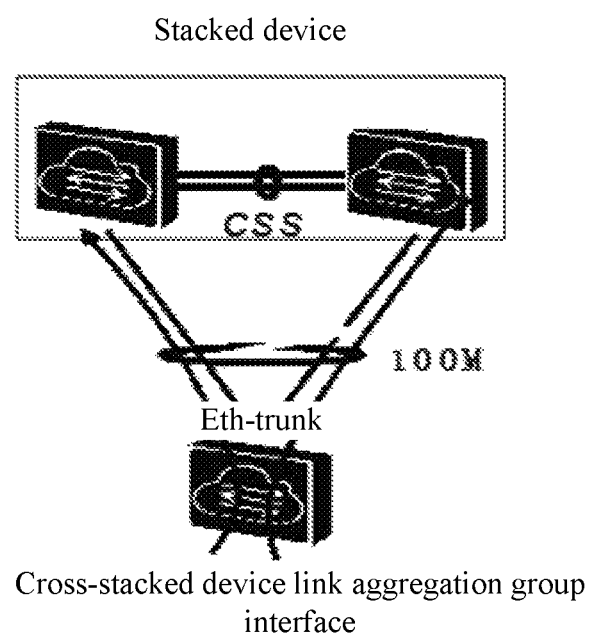
FIG. 1 is a schematic structural diagram of a cross-frame link aggregation group interface.

As shown in FIG. 1, which is a schematic view of a network topology for a link aggregation group interface (Eth-Trunk) including member ports crossing stacked device (crossing single boards), the link aggregation group interface includes two member ports, where the two member ports go up to two different chipsets in the stacked devices via links, respectively. For the link aggregation group interface shown in FIG. 1, there are two traditional methods for data traffic restriction:

One method is to synchronously spread an entire CIR (Committed Information Rate, Committed Information Rate), which is set for the link aggregation group interface, onto each member port of the link aggregation group interface, suppose that the entire CIR configured for the link aggregation group interface shown in FIG. 1 is 100M, then the data traffic that is allowed to pass by each member port of this link aggregation group interface is also 100M, the sum of the data traffic that is allowed to pass by two member ports is 200M, which is inconsistent with the entire CIR which is set as 100M.

The other method is to set a weight in a statistic estimating manner, suppose that the entire CIR configured for the link aggregation group interface shown in FIG. 1 is 100M, the weight for the two member ports is 1:1, that is, the restricted data traffic over each of the two member ports is 50M. If the data traffic distributed to one member port is 60M while the data traffic distributed to another member port is 40M, since the maximal data traffic which is allowed to pass by the one member port is 50M, then the actual data traffic over the two member ports is 50M+40M=90M, which cannot meet the expected entire data traffic, i.e., 100M, as required by the service provider. In this method for data traffic restriction, the actual data traffic over each member port of the link aggregation group interface cannot exceed the data traffic allocated to each member port, when the actual data traffic over a certain member port is lower than the data traffic restricted on this member port, the entire data traffic of the whole link aggregation group interface will be less than a preset entire data traffic.

The method for data traffic restriction according to embodiments of the present invention may be applied to link aggregation group interfaces in a network device (for example, a frame-type device or a stacked device and etc.), where the link aggregation group interface (Eth-Trunk) including member ports crossing single boards or crossing stacked devices, means that member ports of the link aggregation group interface are located on chipsets of different single boards. For a service provider, a restriction parameter for data traffic over this kind of link aggregation group interface is specific to the whole link aggregation group interface, namely, a sum of the data traffic allowed to pass by all the member ports of the link aggregation group interface is the entire data traffic set by the service provider for the link aggregation group interface.

Before restricting the data traffic, firstly, configure a credit bucket for each link aggregation group interface in the network device (there may be a plurality of link aggregation group interfaces in the network device). The credit bucket is used for storing tokens overflowing from a token bucket corresponding to each chipset of a single board of the link aggregation group interface, and the tokens overflowing from different token buckets are distinctively labeled (for example, dyeing the tokens overflowing from different token buckets into different colors);

Optionally, the credit bucket discards part or all of the tokens in the credit bucket according to a preset condition, and, when the credit bucket discards the tokens, the credit bucket discards the tokens from different token buckets according to a preset fair scheduling algorithm, so as to ensure that the tokens in the credit bucket can exactly reflect a situation of the remnant data traffic of each member port of the link aggregation group interface. Said preset condition may include the following situations:

①. During a period when the token bucket does not borrow tokens from the credit bucket, if a storing time of a token in the credit bucket exceeds a preset duration, discard the token according to the preset fair scheduling algorithm, and, if the tokens in the token bucket are from different token buckets, discard the tokens from the different token buckets according to a preset fair scheduling algorithm; where the period may be a preset multiple of a clock period in a CPU.

②. When it is detected that there is no token in the token bucket, discard the tokens which are stored in the credit bucket and overflow from the token bucket before a current period.

Bucket parameters of the credit bucket and each token bucket are pre-configured, where the bucket parameters include a rate of putting tokens into the token bucket, a space of the token bucket and a space of the credit bucket.

Assuming that the number of token buckets of chipsets of single boards (such as single board chips of a frame-type device or chips of a box-type device) belonging to the link aggregation group interface is M, an entire CIR (or PIR) of the link aggregation group interface is N1, an entire CBS or PBS is N2, an initial space of the $i^{th}$ token bucket is CBSi (or PBSi), an initial rate of putting tokens of the $i^{th}$ token bucket is CIRi (or PIRi), then each bucket parameter meets the following formulas:

$$N1 = \sum_{i=1}^{M} CIRi, \quad \text{(formula 1)}$$

or $$N1 = \sum_{i=1}^{M} PIR_i$$

$$N2 = \sum_{i=1}^{M} CBSi, \quad \text{(formula 2)}$$

or $$N2 = \sum_{i=1}^{M} PBSi$$

Where, the CBS (Committed Burst Size, committed burst size), PBS (Peak Burst Size, peak burst size).

The space of the credit bucket equals to the total space of all the token buckets, namely, the space of the credit bucket equals to N2.

The procedure of configuring bucket parameters may include:

determining a rate of putting tokens CIRi according to a preset method for determining the rate of putting tokens, for example, according to a rate equal division determining method, that is, CIRi=N1/M; or determining according to weight values of the member ports, that is, a rate weight determining method, assuming that the weight value of the $i^{th}$ member port is Pi, namely, $$CIRi = N1 * Pi \Big/ \sum_{i=1}^{M} Pi.$$

Certainly, the rate of putting tokens can be determined according to other methods, which are not limited in the present application.

The initial space CBSi of the token bucket may be determined according to a space determining method, for example, a space equal division determining method, that is, CBSi=N2/M; or according to a space weight determining method, assuming that the weight value of the $i^{th}$ member port is Pi, namely, $$CBSi = N2 * Pi \Big/ \sum_{i=1}^{M} Pi.$$

Certainly, the space of the token bucket can be determined according to other methods.

Figure 2:
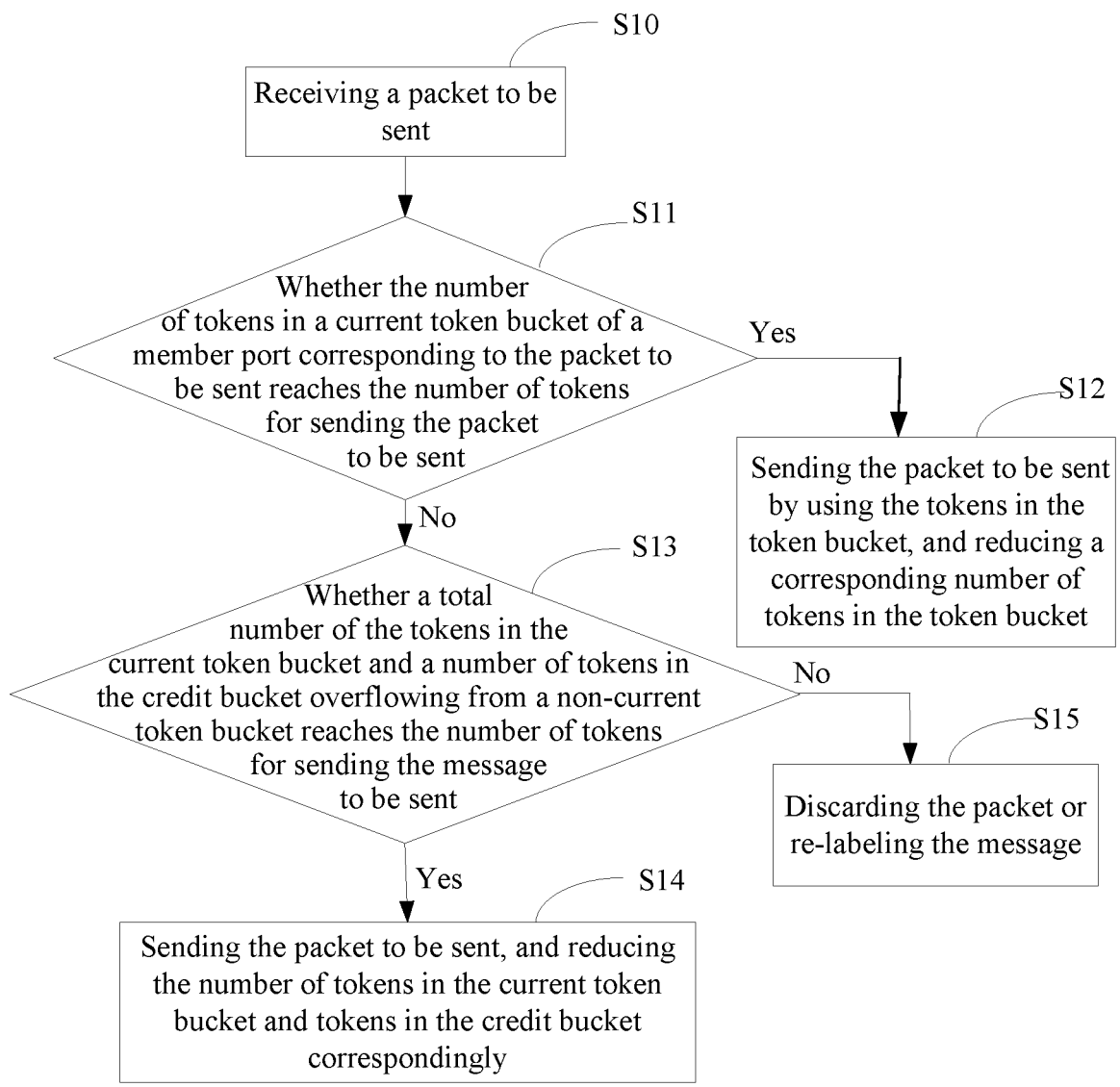
FIG. 2 is a schematic flowchart of a method for data traffic restriction according to an embodiment of the present invention.

Referring to FIG. 2, which is a schematic flowchart of a method for data traffic restriction according to an embodiment of the present invention, as shown in FIG. 2, the method may include the following steps:

S10, receiving a packet to be sent.

S11, determining whether the number of tokens in a current token bucket of a member port corresponding to the packet to be sent reaches the number of tokens for sending the packet to be sent; if no, execute step S13; if yes, execute step S12.

After receiving a packet to be sent, determine which member port the packet to be sent belongs to, and determine the chipset of a single board corresponding to the member port, thus determine the corresponding token bucket. After determining the token bucket, determine whether the number of tokens in the token bucket reaches the number of tokens for sending the packet to be sent, if yes, then in step S12, send the packet to be sent by using the tokens in the token bucket, and reduce the corresponding number of tokens in the token bucket.

If the number of tokens in the current token bucket does not reach the number of tokens for sending the packet to be sent, in step S13, determine whether the sum of the number of tokens in the current token bucket and a number of tokens overflowing from a non-current token bucket in the credit bucket reaches the number of tokens for sending the packet to be sent; if yes, execute S14; if no, execute S15.

In one embodiment of the present invention, the determining procedure in step S13 may include the following steps:

1), determining a difference of tokens between the number of tokens in the current token bucket and the number of tokens for sending the packet to be sent;

2), determining whether the number of tokens overflowing from the non-current token bucket in the credit bucket is not less than the difference of tokens;

if the number of the tokens overflowing from the non-current token bucket in the credit bucket is not less than the difference of tokens, in step 3), determine that the number of the tokens in the current token bucket and green tokens in the credit bucket reaches the number of tokens for sending the packet to be sent;

if the number of tokens overflowing from the non-current token bucket in the credit bucket is less than the difference of tokens, in step 4), determine the tokens in the current token bucket and the green tokens in the credit bucket do not reach the number of tokens for sending the packet to be sent.

If the sum of the number of the tokens in the current token bucket and the tokens in the credit bucket reaches the number of tokens for sending the packet to be sent, in step S14, send the packet to be sent, and reducing the number of tokens in the current token bucket and in the credit bucket correspondingly.

Assuming that the number of tokens that are lacked for sending the packet to be sent is N, then after sending the packet to be sent, the tokens in the current token bucket are wiped up, in the meantime, the number of tokens overflowing from the non-current token bucket in the credit bucket reduces by N.

If the sum of the number of the tokens in the current token bucket and the tokens in the credit bucket does not reach the number of tokens for sending the packet to be sent, in step S15, discard the packet or re-label the packet.

If the number of tokens overflowing from a non-current token bucket in the credit bucket are less than the difference of tokens, namely, there isn't enough tokens for sending the packet to be sent, discard the packet to be sent, or re-label a field such as an IP Precedence, a DSCP or an EXP of the packet to be sent and then send the relabeled packet. At this time, the numbers of tokens in the token bucket and in the credit bucket both remain unchanged.

The method for data traffic restriction according to the embodiment, firstly, configure for each link aggregation group interface in the network device, a credit bucket for storing tokens overflowing from each token bucket, and the tokens overflowing from different token buckets are distinctively labeled; when receiving a packet to be sent, firstly determine whether the number of tokens in the token bucket corresponding to the packet to be sent reaches the number for sending the packet to be sent, if a number of tokens in the token bucket is not sufficient for sending the packet to be sent, borrow, from the credit bucket, tokens overflowing from a non-current token bucket, if the tokens of the current token bucket and the borrowed tokens are sufficient for sending the packet to be sent, send the packet to be sent, and meanwhile, reduce the number of corresponding tokens in the current token bucket and in the credit bucket. A dynamic restriction of data traffic over a plurality of links of each link aggregation group interface in the network equipment is achieved, so that the sum of the data traffic over the member ports in the link aggregation group interfaces can be better matched with the entire data traffic restricted for the link aggregation group interfaces.

Figure 3:
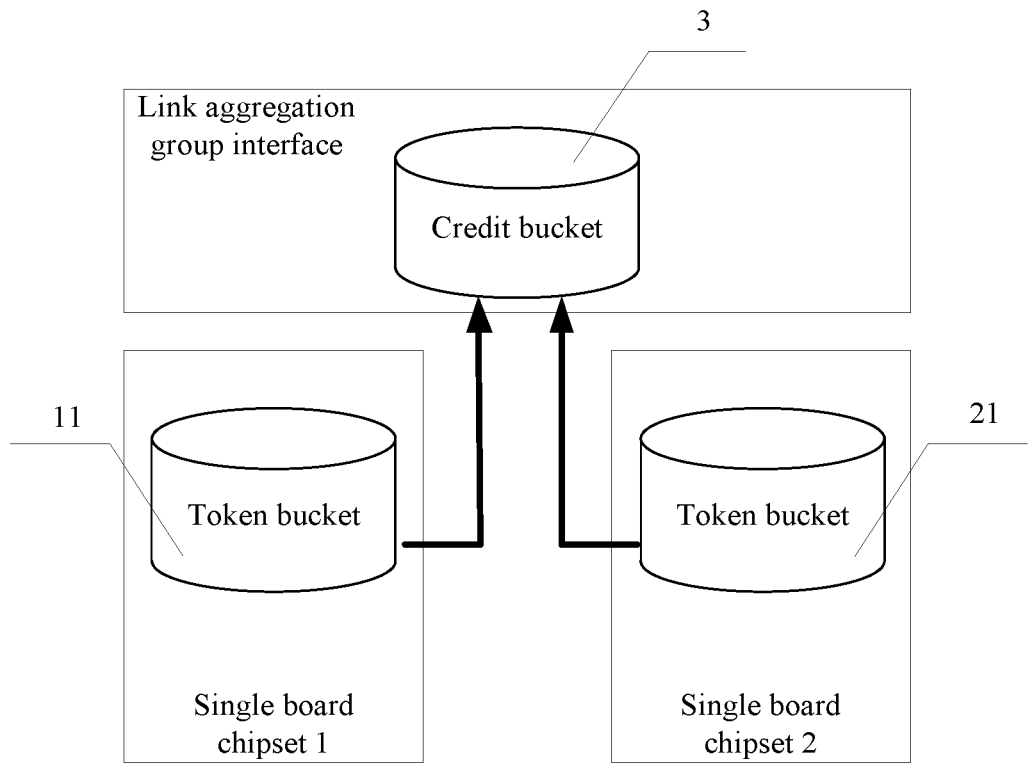
FIG. 3 is a schematic view of a specific application scenario for FIG. 1 according to an embodiment of the present invention.

As shown in FIG. 3, which is a schematic view of a specific application scenario corresponding to the embodiment shown in FIG. 1.

As shown in FIG. 3, two member ports of a current link aggregation group interface are located on a chipset of a single board 1 and a chipset of a single board 2 respectively, token buckets configured for the two chipsets of single boards are respectively a token bucket 11 and a token bucket 21, and a credit bucket 3 is configured for the link aggregation group interface. The credit bucket 3 dyes the tokens overflowing from the token bucket 11 into blue, and dyes the tokens overflowing from the token bucket 21 into green. The link aggregation group interface shown in this embodiment contains two links, the method for data traffic restriction provided in this embodiment of the present application can be applied to a link aggregation group interface containing an arbitrary number of links.

In order to facilitate the description, assuming that the entire CIR of the link aggregation group interface is 100M, the CIRs of the token bucket 11 and the token bucket 21 are both set as 50M of data traffic. Besides, at an initial moment t0 when the link aggregation group works after being established, all the token buckets are full, that is, the token buckets are full of tokens, then take tokens out of the token buckets according to the actual data traffic over the member ports, and put tokens into the token buckets according to the preset rate of putting tokens.

Figure 4:
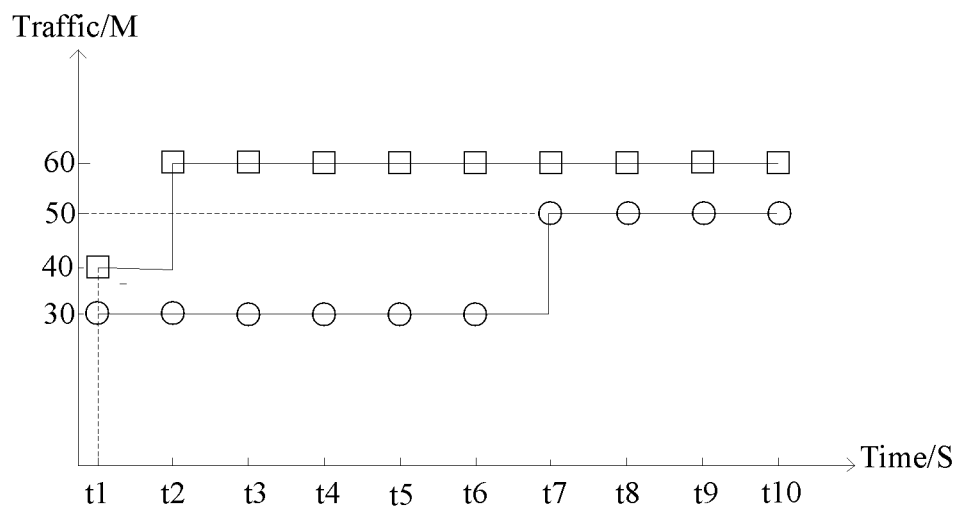
FIG. 4 is a data traffic variation curve of the link aggregation group interface shown in FIG. 1.

FIG. 4 is a schematic view of a curve of the data traffic over the two member ports of the link aggregation group interface varies with time; in FIG. 4, the horizontal axis is a time axis, the vertical axis is the data traffic over the member ports, the curve with ○ in the figure refers to the data traffic variation curve of the member port corresponding to the chipset of the single board 1, the curve with □ in the figure refers to the data traffic variation curve of the member port corresponding to the chipset of the single board 2, where, assuming that the time interval between every two moment points is a period, that is, the figures shows nine periods of the data traffic variation curves, where, the period is a preset multiple of a clock period in a CPU.

During the time interval from t1 to t2, the data traffic of the load shared by the member port corresponding to the chipset 1 is 30M (which does not exceed the limited data traffic of 50M), the data traffic of the load shared by the member port corresponding to the chipset 2 is 40M (which does not exceed the limited data traffic of 50M), then the entire data traffic over the link aggregation group interface is 70M. During this time interval, the rate of putting tokens into the token bucket 11 (50M) is greater than the data traffic rate (30M), the rate of putting tokens into the token bucket 21 (50M) is greater than the data traffic rate (40M). Namely, both of the token buckets have tokens overflowing therefrom, the overflowed tokens are taken away by the credit bucket according to a certain fair scheduling algorithm and are dyed into corresponding colors by the credit bucket after then, the tokens overflowing from the token bucket 11 are dyed into blue and are put into the credit bucket 3, the tokens overflowing from the token bucket 21 are dyed into green and are put into the credit bucket 3, when the tokens have been stored in the credit bucket 3 for a preset duration, discard the tokens dyed in different colors according to the preset fair scheduling algorithm, assuming that the preset duration is a period, the blue tokens and the green tokens in the credit bucket 3 are all discarded.

At the moment t2, the data traffic of the load shared by the member port corresponding to the chipset 2 increases from 40M to 60M, and the data traffic over the member port corresponding to the chipset 1 remains unchanged, during the time interval from t2 to t3, the data traffic of the load shared by the member port corresponding to the chipset 2 is 60M, at this time, the rate of putting tokens into the token bucket 11 (50M) is greater than the data traffic rate (30M), namely, the tokens in the token bucket 11 overflow, the overflowed tokens are taken away and are dyed into blue by the credit bucket 3, during the time interval from t2 to t3, 20M*(t3−t2) remnant tokens in the token bucket 11 are put into the credit bucket 3. The rate of putting tokens into the token bucket 21 is less than the data traffic, namely, the member port corresponding to the chipset 2 needs to borrow, from the credit bucket 3, tokens overflowing from the token bucket 11 when sending a packet, the number of the blue tokens in the credit bucket is 20M*(t3−t2), which is greater than (60−50)M*(t3−t2), therefore, the data traffic of 60M is allowed to pass by the member port corresponding to the chipset 2, the entire data traffic of the link aggregation group interface is 30M+60M=90M, which does not exceed the entire data traffic of 100M. Till the moment t3, 10M*(t3−t2) remnant blue tokens in the credit bucket are discarded. During the time interval from t3 to t7, the variation situation of the data traffic over the two chipsets are as same as that during the time interval from t2 to t3, and the procedure of allocating the tokens is also the same, the details are not repeated herein.

At the moment t7, the data traffic of the load shared by the member port corresponding to the chipset 1 increases from 30M to 50M, during the time interval from t7 to t8, at this time, the rate of putting tokens into the token bucket 21 equals to the rate at which the tokens are taken out, there is no redundant token to be put into the credit bucket 3; during the time interval, the data traffic of load shared by the member port corresponding to the chipset 2 is still 60M, namely, the rate of putting tokens into the token bucket 11 is less than the rate at which the tokens are token out, 10M tokens needs to be borrowed from the credit bucket so as to allow 60M data traffic pass by, however, since there is no redundant token in the token bucket 21 to be put into the credit bucket, therefore, there is no token in the credit bucket that meets the condition, so merely 50M data traffic is allowed to pass by the member port corresponding to the chipset 2, the sum of the entire data traffic on the two member ports is 50M+50M=100M, which equals to the entire CIR or the entire PIR set for the link aggregation group interface.

Figure 5:
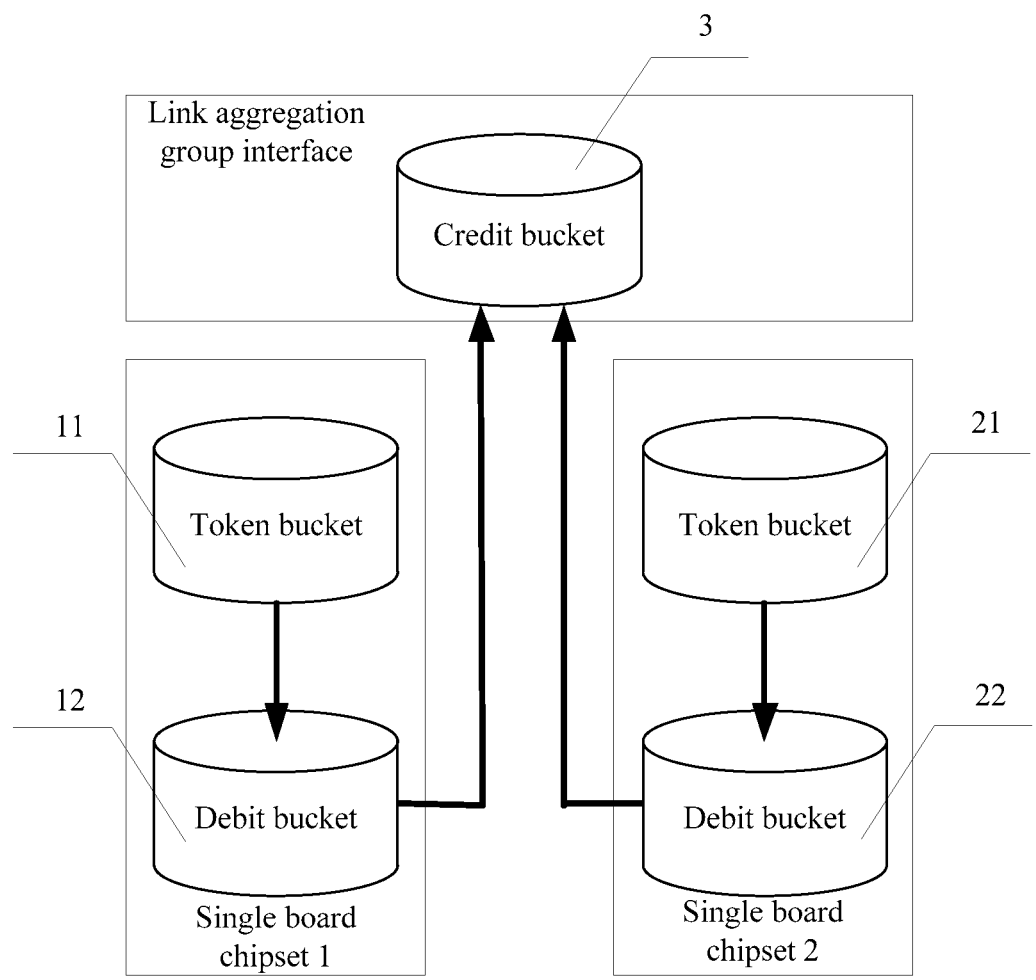
FIG. 5 is a schematic view of another specific application scenario for FIG. 1 according to an embodiment of the present invention.

Please refer to FIG. 5, which shows a schematic view of another application scenario according to an embodiment of the present application, in the application scenario shown in FIG. 3, a debit bucket may be further configured for each chipset of a single board. After setting the debit buckets, the procedures of sending a packet and allocating a token are as same as the corresponding procedures of the embodiment shown in FIG. 1, the details are not repeated herein.

Two member ports of the current link aggregation group interface are located on a chipset of a single board 1 and a chipset of a single board 2 respectively. Configure a token bucket 11 and a debit bucket 12 for the chipset of the single board 1, and configure a token bucket 21 and a debit bucket 22 for the chipset of the single board 2. Where, the debit bucket is used for storing tokens overflowing from token buckets in the same chipset of a single board, when the debit bucket is full, the tokens overflowing from the token buckets are directly discarded. Configure a credit bucket 3 for the link aggregation group interface of the network device, when the preset triggering condition is met, the credit bucket 3 takes tokens from each debit bucket according to a preset fair scheduling algorithm, so as to ensure that during the period T, the credit bucket 3 equally takes tokens from the debit buckets corresponding to the token buckets having tokens overflowing therefrom (namely, ensure that labels of the tokens in the credit bucket are uniformly distributed, or, colors of the tokens are distributed in accordance with a preset proportion), further ensure that when the data traffic over any one of the member ports of the link aggregation group interface increases suddenly, and when there is remnant data traffic on other member ports, the member port of which the data traffic increases suddenly can borrow tokens from the credit bucket, avoid a phenomenon that tokens in the credit bucket are all in the same color which causing the token bucket cannot borrow tokens in other colors, thereby exactly controlling the entire data traffic over the link aggregation group interface including cross-chipset member ports.

Where, the preset triggering condition may include:

①. During a period when there is no token bucket borrowing a token from the credit bucket, the credit bucket equally takes tokens from each debit bucket according to a first preset duration and according to a fair scheduling algorithm;

②. When a token bucket borrows tokens from the credit bucket, and if a second preset duration has passed since the last time when the credit bucket takes a token from the debit bucket, equally take tokens from each debit bucket according to the fair scheduling algorithm;

③. If the number of tokens in the credit bucket is less than a preset value, the credit bucket takes tokens from each debit bucket according to the fair scheduling algorithm. The preset value can be set freely according to actual needs.

Where, a sum of the space of each debit bucket equals to the entire CBS or the entire PBS of the link aggregation group interface, the space of each debit bucket may be determined according to an equal division determining method or a weight determining method, certainly, other methods may also be adopted to determine the space.

Continue with the data traffic variation example in FIG. 4, put tokens into the token bucket 11 and the token bucket 21 according to a specified rate of putting tokens (50M), during the time interval from t1 to t2, the rate of putting tokens into the token bucket 11 (50M) is greater than the data traffic (30M), the tokens overflow, and the overflowed tokens are put into the debit bucket 12; in the meantime, the rate of putting tokens into the token bucket 21 (50M) is greater than the data traffic (40M), the tokens overflow, and the overflowed tokens are put into the debit bucket 22. At this time, the credit bucket 3 takes tokens from the debit bucket 12 and the debit bucket 22 according to a certain fair scheduling algorithm, and dyes the tokens from the two debit buckets into different colors. Where, the fair scheduling algorithm may be any fair scheduling algorithm, which are not limited in the present application.

The link aggregation group interface structure provided in this embodiment, configures a debit bucket for each chipset of a single board in the link aggregation group interface, uses the debit bucket to store tokens overflowing from the token buckets in the same chipset of a single board, then, the credit bucket takes tokens from each debit bucket at triggering time points, thereby avoiding the credit bucket taking tokens from token bucket once there is a token overflows from the token bucket, that is, avoiding frequent interactions between a main control panel corresponding to the credit bucket and a single board corresponding to the token bucket, thus reducing requirements on performance parameters of the main control panel corresponding to the credit bucket, and reducing cost of the network device.

Figure 6:
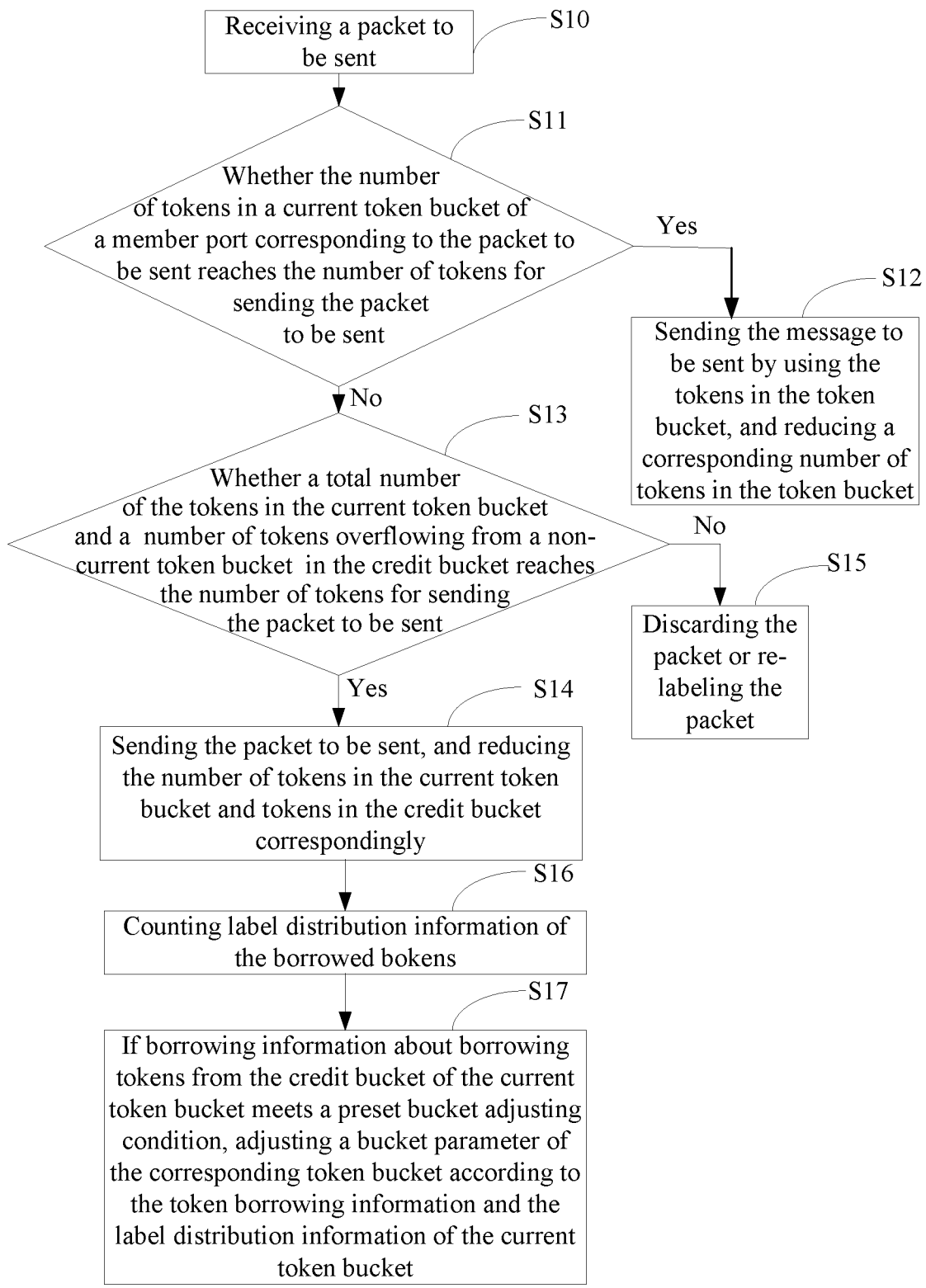
FIG. 6 is a schematic flowchart of another method for data traffic restriction according to an embodiment of the present invention.

Please refer to FIG. 6, which shows a schematic flowchart of another method for data traffic restriction according to an embodiment of the present application, based on the embodiment shown in FIG. 2, further including the following steps:

After step S14, execute step S16, analyzing label distribution information of the borrowed tokens; where the label distribution information includes the labels of the tokens and the corresponding amount of borrowing, namely, counting the tokens labeled in each color and the corresponding amount of borrowing, for example, the amount of borrowed green tokens are 50M.

S17, if borrowing information about borrowing tokens from the credit bucket of the current token bucket meets a preset bucket adjusting condition, adjusting a bucket parameter of the corresponding token bucket according to the token borrowing information and the label distribution information of the current token bucket; and the adjusted bucket parameters of each token bucket still need to be in accordance with the parameters set for the data traffic over the link aggregation group interface, where the bucket parameters include the rate of putting tokens and the space. The borrowing information includes the amount of borrowed tokens, the number of times for borrowing tokens and/or a proportion of borrowing, where the proportion of borrowing refers to a ration between the number of tokens borrowed by a certain token bucket and the number of tokens needed for sending the packet to be sent.

Where the preset bucket adjusting condition may include that the number of tokens continuously borrowed from the credit bucket of a certain token bucket exceeds a first threshold value, and/or, the number of times of continuously borrowing tokens by a certain token bucket from the credit bucket exceeds a preset number of times, showing that the traffic over a certain member port always exceeds the data traffic set for it, and the traffic over other member ports are always less than the set data traffic, at this time, trigger a dynamic bucket adjustment, increase the rate of putting tokens and the space of the token bucket which always borrows tokens from the credit bucket, reduce the rate of putting tokens and the space of the token bucket which always have tokens overflowing therefrom, where the condition that a sum of the reduced rate of putting tokens equals to a sum of the increased rate of putting tokens is met, that is, ensuring that the sum of the adjusted rate of putting tokens into each token bucket equals to the entire CIR of the link aggregation group interface or the entire PIR of the link aggregation group interface, and, meeting the condition that the reduced space equals to the increased space, namely, ensuring that the sum of the space to be adjusted of each token bucket equals to the entire CBS of the link aggregation group interface or the entire PBR of the link aggregation group interface. The first threshold value can be set freely according to actual needs.

In an embodiment of the present invention, the procedure of adjusting the bucket parameters of the current token bucket may include the following steps:

11), increasing the space of the current token bucket according to the borrowing information of the current token bucket (for example, the proportion of borrowing);

12), reducing, according to label distribution information of the tokens borrowed from the credit bucket of the current token bucket, the space of corresponding token buckets other than the current token bucket, the sum of the reduced space equals to the sum of the increased space;

13), determining, according to the re-determined space of each token bucket and a method for computing the rate of putting tokens, new rate of putting tokens into each token bucket.

Continue with the data traffic variation example in FIG. 4, assuming that during the time interval from t2 to t4, the data traffic of the load shared by the member port corresponding to the chipset 1 is always 30M, the data traffic of the load shared by the member port corresponding to the chipset 2 is always 60M, the token bucket 21 continuously borrows tokens from the credit bucket 3, and in each period, the token rate at which the token bucket 21 borrows tokens from the credit bucket is 10M, and the borrowed tokens are all from the token bucket 11. Then calculate the space that needed to be adjusted to, and the adjusting strategy, including: the space of the token bucket 11 is adjusted to 50M*T−10M*T=40M*T, the corresponding rate of putting tokens is adjusted to 40M; in the meantime, the space of the token bucket 21 is adjusted to 50M*T+10M*T=60M*T, the corresponding rate of putting tokens is adjusted to 60M. After dynamically adjusting the bucket parameters of the token buckets, during the time interval from t4 to t7, the rate of putting tokens into each token bucket are in accordance with the data traffic over the member port, there is no need to borrow tokens from the credit bucket, thereby achieving a dynamic control on the data traffic over the member port while ensuring the entire data traffic of the link aggregation group interface is met, and increasing the control accuracy of the entire data traffic.

In another embodiment of the present invention, differing from the foregoing dynamic bucket adjusting procedure, firstly, determine the rate of putting tokens that needs to be adjusted to, then based on a relationship between the rate of putting tokens and the space of the token bucket, determine the space of the token bucket that needs to be adjusted to and the final adjusting strategy. The procedure of adjusting the bucket parameters of the current token bucket may include the following steps:

21), increasing, according to borrowing information of the current token bucket, the rate of putting tokens into the current token bucket from an initial rate of putting tokens to a new rate of putting tokens. Where the new rate of putting tokens is greater than the initial rate of putting tokens.

22), adjusting the space of the current token bucket according to the new rate of putting tokens into the current token bucket and the relationship between the rate of putting tokens and the space of the token bucket.

23), determining, according to label distribution information of tokens borrowed from the credit bucket of the current token bucket, adjusting space of corresponding token buckets other than the current token bucket, so that a sum of reduced space equals to a sum of increased space.

Optionally, in the application scenario shown in FIG. 5, after dynamically adjust the bucket parameters of the token bucket, the space of the debit bucket may also be dynamically adjusted, where the space of the debit bucket may be adjusted according to an adjusting proportion of the token bucket.

According to the method for data traffic restriction according to the embodiment, if the borrowing information about borrowing tokens from the credit bucket of a certain token bucket of the link aggregation group interface meets the preset bucket adjusting condition, adjust the bucket parameters of the corresponding token bucket according to the borrowing information of the current token bucket, where the bucket parameters include the rate of putting tokens and the space. Thus a dynamic adjustment on the bucket parameters of the token buckets for each link in the link aggregation group interface is finally achieved, so that the rate of putting tokens into each token bucket matches with the data traffic over the member port corresponding to the token buckets, thereby increasing the control accuracy of the entire data traffic of the link aggregation group interface.

Through the descriptions of the foregoing implementation manners, a person skilled in the art can clearly understand that the present invention may be implemented using software plus necessary universal hardware, and certainly may be implemented using hardware. However, in most cases, the former is a preferred implementation manner. Based on such an understanding, the technical solutions of the present disclosure essentially, or the part contributing to the prior art may be implemented in the form of a software product. The computer software product is stored in a storage medium and includes several instructions for instructing a computer device (which may be a personal computer, a server, or a network device) to perform all or a part of the methods described in the embodiments of the present invention. The storage medium includes: any medium that can store program codes, such as a read-only memory (ROM, Read-Only Memory), a random access memory (RAM, Random Access Memory), a magnetic disk, or an optical disk.

Corresponding to the embodiments of methods for data traffic restriction provided in the present invention, the present invention also provides embodiments of apparatuses for data traffic restriction.

Figure 7:
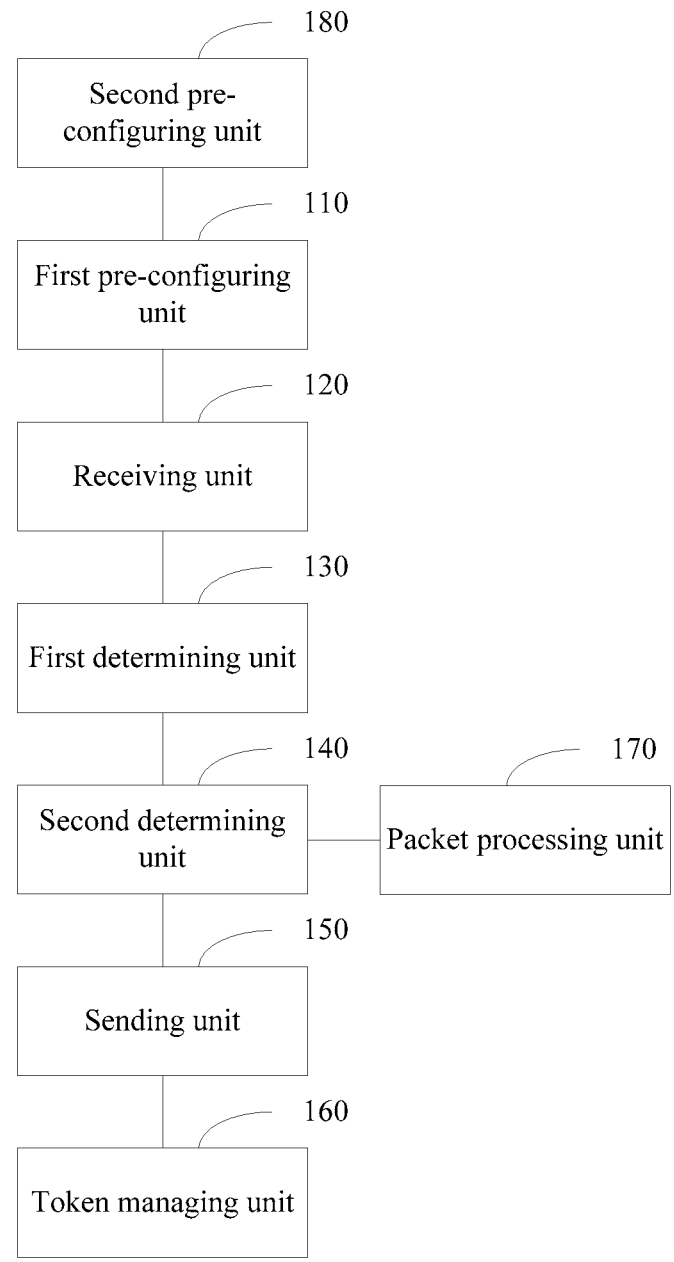
FIG. 7 is a schematic structural diagram of an apparatus for data traffic restriction according to an embodiment of the present invention.

Please refer to FIG. 7, which is a schematic structural diagram of an apparatus for data traffic restriction according to an embodiment of the present invention, the apparatus for data traffic restriction is applied to a network device, the network device may be a frame-type device, a stacked device or other devices. As shown in FIG. 7, the apparatus includes: a first pre-configuring unit 110, a receiving unit 120, a first determining unit 130, a second determining unit 140, a sending unit 150 and a token managing unit 160.

The first pre-configuring unit 110 is configured to pre-configure a credit bucket for each link aggregation group interface in the network device, where the credit bucket is used for storing tokens overflowing from each token bucket, and the tokens overflowing from different token buckets are distinctively labeled; and, pre-configure bucket parameters for the credit bucket and each token bucket, where the bucket parameters include rates of putting tokens into the token buckets, space of the token buckets and space of the credit bucket.

The receiving unit 120 is configured to receive a packet to be sent.

The first determining unit 130 is configured to determine whether the number of tokens in a current token bucket corresponding to the packet to be sent reaches the number of tokens for sending the packet to be sent.

The second determining unit 140 is configured to, if the number of tokens in the current token bucket does not reach the number of tokens for sending the packet to be sent, determine whether a sum of the number of the tokens in the current token bucket and the number of tokens overflowing from the non-current token bucket in the credit bucket reaches the number of tokens for sending the packet to be sent.

In an embodiment of the present invention, the second determining unit includes following sub-units:

a determining sub-unit, configured to determine a difference of tokens between the number of tokens in the current token bucket and the number of tokens for sending the packet to be sent.

A determining sub-unit, configured to determine whether the number of tokens overflowing from the non-current token bucket in the credit bucket is not less than the difference of tokens.

A first determining sub-unit, configured to, if the number of tokens overflowing from the non-current token bucket in the credit bucket is not less than the difference of tokens, determine that the sum of the number of the tokens in the current token bucket and the tokens in the credit bucket reaches the number of tokens for sending the packet to be sent.

A second determining sub-unit, configured to, if the number of tokens overflowing from the non-current token bucket in the credit bucket is less than the difference of tokens, determine that the tokens in the current token bucket and the tokens in the credit bucket do not reach the number of tokens for sending the packet to be sent.

The sending unit 150 is configured to, if the sum of the number of the tokens in the current token bucket and the tokens in the credit bucket reaches the number of tokens for sending the packet to be sent, send the packet to be sent.

The token managing unit 160 is configured to reduce the number of tokens in the current token bucket and tokens in the credit bucket correspondingly.

Optionally, the embodiment of apparatus shown in FIG. 7 may further include: a packet processing unit 170, configured to, if the sum of the number of the tokens in the current token bucket and the number of tokens overflowing from the non-current token bucket in the credit bucket does not reach the number of tokens for sending the packet to be sent, discard the packet to be sent; or, if the sum of the number of the tokens in the current token bucket and the number of tokens overflowing from the non-current token bucket in the credit bucket does not reach the number of tokens for sending the packet to be sent, re-label and send the packet to be sent.

Optionally, the apparatus for data traffic restriction shown in FIG. 7 may also include a second pre-configuring unit 180.

The second pre-configuring unit 180 connects with the first pre-configuring unit 110, and is configured to pre-configure a debit bucket for each token bucket, and set space of the debit bucket according to a preset space determining method, where a sum of the space of each debit bucket equals to an entire CBS or an entire PBS, where the preset space determining method includes a space equal division determining method or a space weight determining method, where the debit bucket is used for storing tokens overflowing from token buckets belonging to the same chipset of a single board, so that the debit bucket stores tokens which are equally taken out from each debit bucket according to a preset condition.

The apparatus for data traffic restriction as provided in the present invention, firstly, configures, for each link aggregation group interface in the network device, a credit bucket for storing tokens overflowing from each token bucket, and the tokens overflowing from the different token buckets are distinctively labeled; when a packet to be sent is received, preferably, uses the tokens in the corresponding token bucket to send the packet to be sent, if the number of tokens in the token bucket is not sufficient for sending the packet to be sent, borrows tokens overflowing from a non-current token bucket from the credit bucket, if the tokens of the current token bucket and the borrowed tokens are sufficient for sending the packet to be sent, sends the packet to be sent, and meanwhile, reduces the number of corresponding tokens in the current token bucket and tokens in the credit bucket. A dynamic restriction of data traffic over a plurality of links of each link aggregation group interface in the network equipment is achieved, thus the sum of the data traffic over the member ports in the link aggregation group interfaces can be better matched with the entire data traffic restricted for the link aggregation group interfaces.

Figure 8:
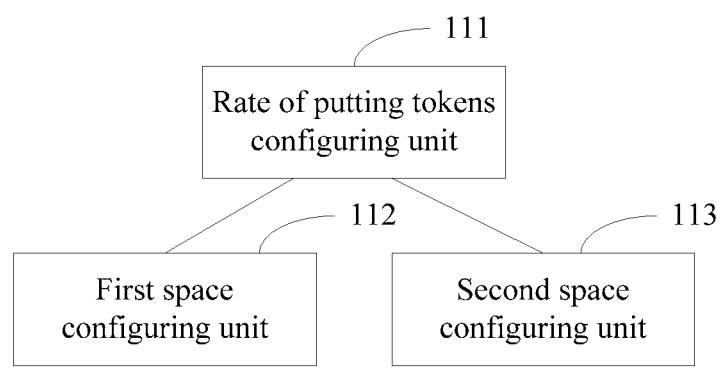
FIG. 8 is a schematic structural diagram of the first pre-configuring unit shown in FIG. 7 of the present invention.

Please refer to FIG. 8, which shows a schematic structural diagram of the first pre-configuring unit shown in FIG. 7, the first pre-configuring unit may further includes following units:

a rate of putting tokens configuring unit 111, configured to determine, according to a preset method for determining a rate of putting tokens, the rate of putting tokens into each token bucket, and a sum of the rates of putting tokens into each token bucket equals to an entire committed information rate CIR of the link aggregation group interface/a peak information rate PIR of the link aggregation group interface, where the preset method for determining the rate of putting tokens includes a rate equal division determining method or a rate weight determining method;

a first space configuring unit 112, configured to determine, according to a preset space determining method, the space of each token bucket, and a sum of the space of each token bucket equals to an entire committed burst size of the link aggregation group interface, where the preset space determining method includes a space equal division determining method or a space weight determining method;

a second space configuring unit 113, configured to configure the space of the credit bucket as the entire CBS or the global PBS.

Figure 9:
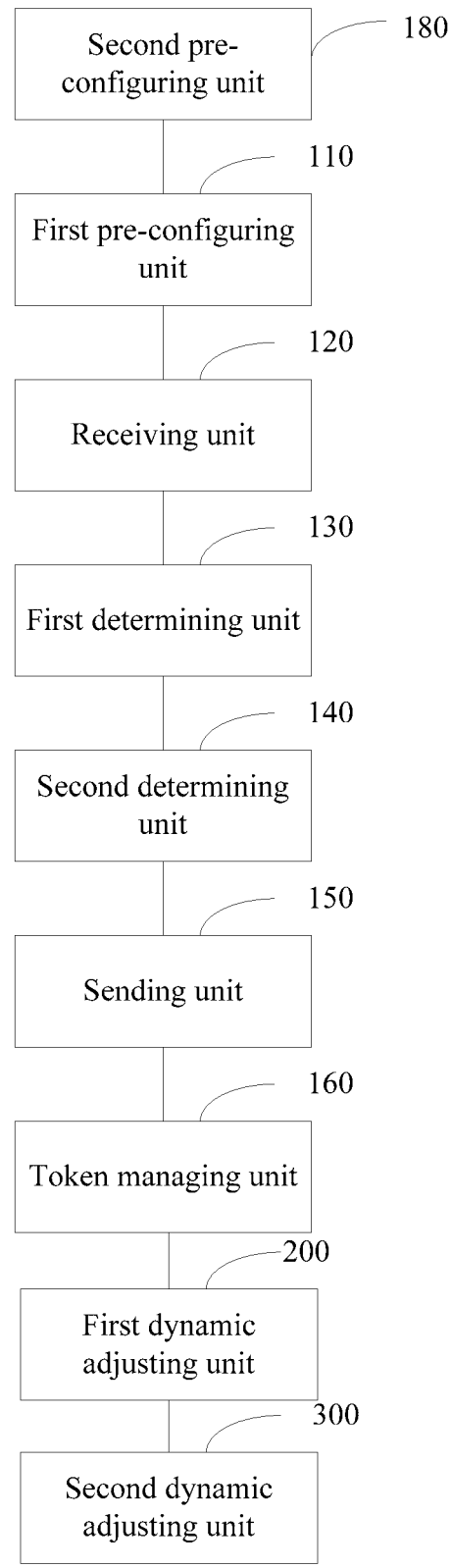
FIG. 9 is a schematic structural diagram of another apparatus for data traffic restriction according to an embodiment of the present invention.

Please refer to FIG. 9, which shows a schematic structural diagram of another apparatus for data traffic restriction according to an embodiment of the present invention, on the basis of the embodiment corresponding to FIG. 7, further including: a first dynamic adjusting unit 200, configured to, in a preset number of latest periods, if borrowing information about borrowing tokens from the credit bucket of the current token bucket meets a preset bucket adjusting condition, adjust bucket parameters of a corresponding token bucket according to the borrowing information of the current token bucket, where the adjusted bucket parameters of each token bucket still need to be in accordance with the parameters set for the data traffic over the link aggregation group interface, where the bucket parameters include the rate of putting tokens and the space. The borrowing information includes a number of borrowed tokens, a proportion of borrowing and/or the number of times for borrowing tokens.

In one embodiment of the present invention, the first dynamic adjusting unit may include: a first space adjusting unit, a second space adjusting unit and a first rate of putting tokens adjusting unit.

The first space adjusting unit is configured to, in a preset number of latest periods, if the number of tokens borrowed by the current token bucket from the credit bucket exceeds a first threshold value, increase the space of the current token bucket according to the borrowing information of the current token bucket.

The second space adjusting unit is configured to reduce the space of corresponding token buckets other than the current token bucket according to label distribution information of tokens borrowed from the credit bucket of the current token bucket, where a sum of reduced space equals to a sum of increased space, and where the label distribution information includes the label of the token and the corresponding amount of borrowing.

The first rate of putting tokens adjusting unit is configured to determine new rates of putting tokens into each token bucket according to the re-determined space of each token bucket and a method for computing the rate of putting tokens.

In another embodiment of the present invention, the first dynamic adjusting unit may include: a rate of putting tokens adjusting unit, a third space adjusting unit and a fourth space adjusting unit.

The second rate of putting tokens adjusting unit is configured to, in a preset number of latest periods, if the number of tokens borrowed by the current token bucket from the credit bucket exceeds a first threshold value, increase the rate of putting tokens into the current token bucket from an initial rate of putting tokens to a new rate of putting tokens according to the debit information of the current token bucket, where the new rate of putting tokens is greater than the initial rate of putting tokens.

The third space adjusting unit is configured to adjust the space of the current token bucket according to the new rate of putting tokens into the current token bucket and a corresponding relation between the rate of putting tokens and the space of the token bucket.

The fourth space adjusting unit is configured to determine, according to label distribution information of tokens borrowed from the credit bucket of the current token bucket, space to be adjusted of corresponding token buckets other than the current token bucket, so that a sum of reduced space equals to a sum of increased space.

Optionally, the apparatus shown in FIG. 9 may further include: a second dynamic adjusting unit 300, configured to dynamically adjust the space of the debit bucket, where the space of the debit bucket may be adjusted according to an adjusting proportion of the token bucket.

According to the apparatus for data traffic restriction according to the embodiment, when the borrowing information about borrowing tokens from the credit bucket of a certain token bucket of the link aggregation group interface meets the preset bucket adjusting condition, increase the bucket parameters of the token bucket according to the borrowing information of the current token bucket, where the bucket parameters include the rate of putting tokens and the space. Thus a dynamic adjustment on the bucket parameters of the token buckets for each link in the link aggregation group interface is finally achieved, so that the rate of putting tokens into each token bucket matches with the data traffic over the member port corresponding to the token buckets, thereby increasing the control accuracy of the entire data traffic of the link aggregation group interface.

Figure 10:
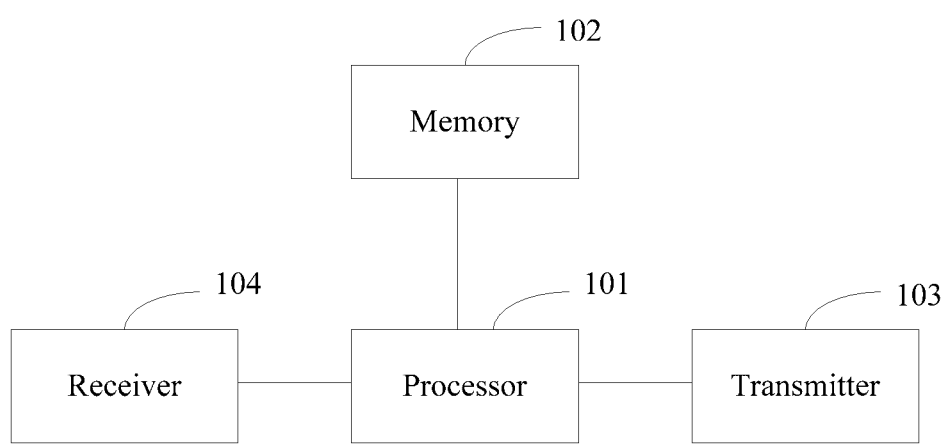
FIG. 10 is a schematic structural diagram of another apparatus for data traffic restriction according to an embodiment of the present invention.

Please refer to FIG. 10, which shows a schematic structural diagram of another apparatus for data traffic restriction according to an embodiment of the present invention, the apparatus includes: a processor 101, a memory 102, a transmitter 103 and a receiver 104.

The receiver 104 is configured to receive a packet to be sent.

The memory 102 is configured to store credit buckets pre-configured for each link aggregation group interface in a network device in advance and bucket parameters of each token buckets; where the credit bucket is used for storing tokens overflowing from each token bucket, and the tokens overflowing from different token buckets are distinctively labeled. And, operation instructions which can be executed by the processor 101 are stored therein, the processor reads the operation instructions stored in the memory 102 to realize following functions:

when receiving a packet to be sent, determining whether the number of tokens in a current token bucket corresponding to the packet to be sent reaches a number of tokens for sending the packet to be sent; if the number of tokens in the current token bucket does not reach the number of tokens for sending the packet to be sent, determining whether a sum of the number of the tokens in the current token bucket and a number of tokens overflowing from a non-current token bucket in the credit bucket reaches the number of tokens for sending the packet to be sent; if the sum of the number of the tokens in the current token bucket and the tokens in the credit bucket reaches the number of tokens for sending the packet to be sent, reducing the number of tokens in the current token bucket and tokens in the credit bucket correspondingly; and sending the packet to be sent by the transmitter 103.

Optionally, in a specific embodiment of the present invention, the memory 102 further includes operation instructions which can be executed by the processor 101, so that the processor reads the operation instructions stored in the memory 102 to realize following functions: if the sum of the number of the tokens in the current token bucket and the number of tokens in the credit bucket overflowing from the non-current token bucket in the credit bucket does not reach the number of tokens for sending the packet to be sent, discarding the packet to be sent or re-labeling the packet to be sent.

Optionally, in a specific embodiment of the present invention, the memory 102 further includes operation instructions which can be executed by the processor 101, so that the processor reads the operation instructions stored in the memory 102 to realize following functions:

pre-configuring a debit bucket for each single board chip, where the debit bucket is used for storing tokens overflowing from token buckets belonging to the same single board chip, so that the debit bucket equally takes tokens from each debit bucket according to a preset condition, and setting space of the debit bucket according to a preset space determining method, where a sum of the space of each debit bucket equals to an entire CBS/PBS, where the preset space determining method includes a space equal division determining method or a space weight determining method.

Optionally, in a specific embodiment of the present invention, the memory 102 further includes operation instructions which can be executed by the processor 101, so that the processor reads the operation instructions stored in the memory 102 to realize following functions:

in a preset number of latest periods, if the number of tokens borrowed by the current token bucket from the credit bucket exceeds a first threshold value, increasing the space of the current token bucket according to the borrowing information of the current token bucket; reducing, according to label distribution information of tokens borrowed from the credit bucket of the current token bucket, the space of corresponding token buckets other than the current token bucket, where a sum of the reduced space equals to a sum of the increased space; determining new rate of putting tokens into each token bucket according to the re-determined space of each token bucket and a method for computing the rate of putting tokens, where the borrowing information includes the label of the token and the corresponding amount of borrowing, where the label distribution information includes the label of the token and the corresponding amount of borrowing.

Optionally, in a specific embodiment of the present invention, the memory 102 further includes operation instructions which can be executed by the processor 101, so that the processor reads the operation instructions stored in the memory 102 to realize following functions:

in a preset number of latest periods, if the number of tokens borrowed by the current token bucket from the credit bucket exceeds a first threshold value, increasing, according to the borrowing information of the current token bucket, the rate of putting tokens into the current token bucket from an initial rate of putting tokens to a new rate of putting tokens; adjusting the space of the current token bucket according to the new rate of putting tokens into the current token bucket and a corresponding relation between the rate of putting tokens and the space of the token bucket; and determining, according to label distribution information of tokens borrowed from the credit bucket of the current token bucket, space to be adjusted of corresponding token buckets other than the current token bucket, so that a sum of reduced space equals to a sum of increased space.

In another aspect, the present invention also provides a network device, including any one of the apparatus for data traffic restriction in the foregoing embodiments.

The embodiments in the specification are described in a progressive manner. The same or similar elements of the respective embodiments may refer to each other. The description of any embodiment focuses on the difference compared with other embodiments. Especially, for the apparatus embodiments, since they are similar to the embodiments of the methods, reference may be made to the embodiments of the corresponding methods, so as to omit the duplicated description. The described apparatus embodiments are merely exemplary, where the units described as separate parts may or may not be physically separate, and parts displayed as units may or may not be physical units, may be located in one position, or may be distributed on multiple network units. Part or all of the modules may be selected according to the actual needs to achieve the objection of the solutions of the embodiments. The person of ordinary skill in the art may understand and implement the present invention without any creative effort.

It should be noted that, in the specification, the terms, such as "first" and "second" and etc., are merely used to distinguish one entity or operation from another entity or operation, rather than to require or hint any actual relationship or order lied under these entities or these operations. Besides, the term "include", "contain" or any other replacement aims to cover a non-exclusive including, so that a procedure, a method, an item or a device that includes a series of elements not only includes these elements, but further includes other elements which are not explicitly listed, or further includes elements inherent in this procedure, method, item or device. An element limited by the expression "including one of . . . " does not exclude the fact that there exists other same elements in the procedure, method, item or device including said element unless more limitations are specified.

The foregoing descriptions are merely specific embodiments of the present invention, it should be noted that, some changes or modifications easily figured out by the person skilled in the art without departing from the principle of the present invention shall all fall within the protection scope of the present invention.

What is claimed is:

1. A method for data traffic restriction, applied in a network device where a link aggregation group interface includes member ports located on different chipsets of single boards, wherein each link aggregation group interface in the network device is configured with a credit bucket and each member port is configured with a token bucket, the credit bucket is used for storing tokens overflowing from the token bucket corresponding to each member port, and the tokens overflowing from different token buckets are distinctively labeled; and, wherein the credit bucket and each token bucket have bucket parameters, the bucket parameters comprise a rate of putting tokens into the token bucket, a space of the token bucket and a space of the credit bucket;

wherein the method for data traffic restriction comprises:
 when receiving a packet to be sent, determining whether a number of tokens in a current token bucket corresponding to the packet to be sent reaches a number of tokens for sending the packet to be sent;
 when the number of tokens in the current token bucket does not reach the number of tokens for sending the packet to be sent, determining whether a sum of the number of the tokens in the current token bucket and a number of tokens overflowing from a non-current token bucket in the credit bucket reaches the number of tokens for sending the packet to be sent;

when the sum of the number of the tokens in the current token bucket and the number of tokens overflowing from the non-current token bucket in the credit bucket reaches the number of tokens for sending the packet to be sent, sending the packet to be sent, and reducing the number of tokens in the current token bucket and tokens in the credit bucket correspondingly;

configuring a debit bucket for each chipset of single boards, wherein the debit bucket is used for storing tokens overflowing the token buckets located on the same chipset of single boards, so that the credit bucket takes tokens from each debit bucket according to a preset fair scheduling algorithm, and setting space of each debit bucket according to a preset space determining method, wherein a sum of the space of each debit bucket equals an entire committed burst size or peak burst size, wherein the preset space determining method comprises a space equal division determining method or a space weight determining method.

2. The method according to claim 1, wherein the determining whether the sum of the number of the tokens in the current token bucket and the number of tokens overflowing from the non-current token bucket in the credit bucket reaches the number of tokens for sending the packet to be sent comprises:

determining a difference of tokens between the number of tokens in the current token bucket and the number of tokens for sending the packet to be sent;

determining whether the number of tokens overflowing from the non-current token bucket in the credit bucket is not less than the difference of tokens;

when the number of tokens overflowing from the non-current token bucket in the credit bucket is not less than the difference of tokens, determining that the sum of the number of the tokens in the current token bucket and the number of tokens overflowing from the non-current token bucket in the credit bucket reaches the number of tokens for sending the packet to be sent; and when the number of tokens overflowing from the non-current token bucket in the credit bucket is less than the difference of tokens, determining that the sum of the number of tokens in the current token bucket and the number of tokens overflowing from the non-current token bucket in the credit bucket do not reach the number of tokens for sending the packet to be sent.

3. The method according to claim 1, further comprising: when the sum of the number of the tokens in the current token bucket and the number of tokens overflowing from the non-current token bucket in the credit bucket does not reach the number of tokens for sending the packet to be sent, discarding the packet to be sent or relabeling the packet to be sent.

4. The method according to claim 1, further comprising:

determining, according to a preset method for determining a rate of putting tokens, the rate of putting tokens into each token bucket, where a sum of the rate of putting tokens into each token bucket equals an entire committed information rate of the link aggregation group interface or a peak information rate of the link aggregation group interface, wherein the preset method for determining the rate of putting tokens comprises a rate equal division determining method or a rate weight determining method;

determining, according to a preset space determining method, the space of each token bucket, wherein a sum of the space of each token bucket equals an entire committed burst size of the link aggregation group interface or a peak burst size of the link aggregation group interface, wherein the preset space determining method comprises a space equal division determining method or a space weight determining method;

wherein the space of the credit bucket equals the entire committed burst size or the peak burst size.

5. The method according to claim 4, further comprising: when the credit bucket meets a preset condition, discarding the tokens in the credit bucket;

wherein when the credit bucket meets a preset condition, discarding the tokens in the credit bucket comprises:

when a token in the credit bucket exceeds a preset duration, discarding the token according to a preset fair scheduling algorithm;

when it is detected that there is no token in a token bucket, discarding the tokens which are stored in the credit bucket and overflow from the token bucket before a current period.

6. The method according to claim 1, further comprising:

in a preset number of latest periods, when borrowing information about borrowing tokens from the credit bucket of the current token bucket meets a preset bucket adjusting condition, increasing the space of the current token bucket according to the borrowing information of the current token bucket; wherein the borrowing information comprises at least one of a number of borrowed tokens, a proportion of borrowing and a number of times for borrowing tokens;

reducing, according to label distribution information of tokens borrowed from the credit bucket of the current token bucket, the space of corresponding token buckets other than the current token bucket, wherein a sum of reduced space equals to a sum of increased space;

determining new rates of putting tokens into each token bucket according to the re-determined space of each token bucket and a method for computing the rate of putting tokens.

7. The method according to claim 1, further comprising:

in a preset number of latest periods, when borrowing information about borrowing tokens from the credit bucket of the current token bucket meets a preset bucket adjusting condition, increasing, according to the borrowing information of the current token bucket, the rate of putting tokens into the current token bucket from an initial rate of putting tokens to a new rate of putting tokens; wherein the borrowing information comprises at least one of a number of borrowed tokens, a proportion of borrowing and a number of times for borrowing tokens.

8. The method according to claim 7, further comprising:

adjusting the space of the current token bucket according to the new rate of putting tokens into the current token bucket and a corresponding relation between the rate of putting tokens and the space of the token bucket;

determining, according to label distribution information of tokens borrowed from the credit bucket by the current token bucket, space to be adjusted of corresponding token buckets other than the current token bucket, so that a sum of reduced space equals to a sum of increased space.

9. An apparatus for data traffic restriction, comprising: a processor, a memory, a transmitter and a receiver;

the memory is configured to store instructions, when executed by the processor, causing the processor to:

configure a credit bucket for each link aggregation group interface in a network device and configure token bucket for each member port included in the link aggregation group interface and located on different chipsets of single boards, wherein the credit bucket is used for storing tokens overflowing from each token bucket, and the tokens overflowing from different token buckets are distinctively labeled;

the memory is configured to store bucket parameters for the credit bucket and each token bucket, wherein the bucket parameters include rates of putting tokens into the token buckets, a space of the token buckets and a space of the credit bucket;

the receiver is configured to cooperate with the processor to receive a packet to be sent;

the memory is further configured to store instructions, when executed by the processor, causing the processor to:

determine whether a number of tokens in a current token bucket corresponding to the packet to be sent reaches a number of tokens for sending the packet to be sent;

when the number of tokens in the current token bucket does not reach the number of tokens for sending the packet to be sent, determine whether a sum of the number of the tokens in the current token bucket and a number of tokens overflowing from a non-current token bucket in the credit bucket reaches the number of tokens for sending the packet to be sent;

the transmitter is configured to cooperate with the processor to send the packet to be sent, when the sum of the number of the tokens in the current token bucket and the number of tokens overflowing from the non-current token bucket in the credit bucket reaches the number of tokens for sending the packet to be sent; and the memory is further configured to store instructions when executed by the processor, causing the processor to reduce the number of tokens in the current token bucket and tokens in the credit bucket correspondingly;

wherein the memory is further configured to store instructions when executed by the processor, causing the processor to:

configure a debit bucket for each chipset of single boards, wherein the debit bucket is used for storing tokens overflowing the token buckets located on the same chipset of single boards, so that the credit bucket takes tokens from each debit bucket according to a preset fair scheduling algorithm, and set space of each debit bucket according to a preset space determining method, wherein a sum of the space of each debit bucket equals an entire committed burst size or a peak burst size, wherein the preset space determining method comprises a space equal division determining method or a space weight determining method, and wherein each debit bucket is used for storing tokens overflowing from the respective token bucket, so that the credit bucket takes tokens from each debit bucket according to a preset fair scheduling algorithm.

10. The apparatus according to claim 9, wherein the memory is configured to store instructions when executed by the processor, causing the processor to:

determine a difference of tokens between the number of tokens in the current token bucket and the number of tokens for sending the packet to be sent;

determine whether the number of tokens overflowing from the non-current token bucket in the credit bucket is not less than the difference of tokens;

when the number of tokens overflowing from the non-current token bucket in the credit bucket is not less than the difference of tokens, determine that the sum of the number of the tokens in the current token bucket and the number of tokens overflowing from the non-current token bucket in the credit bucket reaches the number of tokens for sending the packet to be sent;

when the number of tokens overflowing from the non-current token bucket in the credit bucket is less than the difference of tokens, determine that the sum of the number of tokens in the current token bucket and the number of tokens overflowing from the non-current token bucket in the credit bucket do not reach the number of tokens for sending the packet to be sent.

11. The apparatus according to claim 9, wherein the memory is configured to store instructions when executed by the processor, causing the processor to:

when the sum of the number of the tokens in the current token bucket and a number of tokens overflowing from the non-current token bucket in the credit bucket does not reach the number of tokens for sending the packet to be sent, discard the packet to be sent; or, when the sum of the number of the tokens in the current token bucket and the number of tokens overflowing from the non-current token bucket in the credit bucket does not reach the number of tokens for sending the packet to be sent, re-label the packet to be sent.

12. The apparatus according to claim 9, wherein the memory is configured to store instructions when executed by the processor, causing the processor to:

determine rates of putting tokens into each token bucket according to a preset method for determining a rate of putting tokens, wherein a sum of the rate of putting tokens into each token bucket equals an entire committed information rate of the link aggregation group interface or a peak information rate of the link aggregation group interface, and wherein the preset method for determining the rate of putting tokens comprises a rate equal division determining method or a rate weight determining method;

determine the space of each token bucket according to a preset space determining method, wherein a sum of the space of each token bucket equals to an entire committed burst size of the link aggregation group interface or a peak burst size of the link aggregation group interface, wherein the preset space determining method comprises a space equal division determining method or a space weight determining method; and configure the space of the credit bucket as the entire committed burst size or the peak burst size.

13. The apparatus according to claim 9, wherein the memory is configured to store instructions when executed by the processor, causing the processor to:

in a preset number of latest periods, when the number of tokens borrowed by the current token bucket from the credit bucket exceeds a first threshold value, increase the space of the token bucket according to the borrowing information of the current token bucket; wherein the borrowing information comprises the label of the token and the corresponding amount of borrowing;

reduce, according to label distribution information of tokens borrowed from the credit bucket by the current token bucket, the space of corresponding token buckets other than the current token bucket, wherein a sum of reduced space equals a sum of increased space; and determine new rate of putting tokens into each token bucket according to the re-determined space of each token bucket and a method for computing the rate of putting tokens.

14. The apparatus according to claim 9, wherein the memory is configured to store instructions when executed by the processor, causing the processor to:

in a preset number of latest periods, when the number of tokens borrowed by the current token bucket from the credit bucket exceeds a first threshold value, increase the rate of putting tokens into the current token bucket from an initial rate of putting tokens to a new rate of putting tokens according to the borrowing information of the current token bucket, wherein the borrowing information comprises at least one of a number of borrowed tokens, a proportion of borrowing and a number of times for borrowing tokens.

15. The apparatus according to claim 14, wherein the memory is configured to store instructions when executed by the processor, causing the processor to:

adjust the space of the current token bucket according to the new rate of putting tokens into the current token bucket and a corresponding relation between the rate of putting tokens and the space of the token bucket; and determine, according to label distribution information of tokens borrowed from the credit bucket of the current token bucket, space to be adjusted of corresponding token buckets other than the current token bucket, so that a sum of reduced space equals a sum of increased space.

16. A network device, comprising the apparatus for data traffic restriction according to claim 9.

* * * * *